2 Sheets--Sheet 1.

W. JARRELL.
Cotton Scrapers.

No. 141,355. Patented July 29, 1873.

Witnesses:
A. Bermeinendorf.
O. Sedgwick

Inventor:
W. Jarrell
Per Mmmuff
Attorneys.

AM. PHOTO-LITHOGRAPHIC CO. N.Y. (OSBORNE'S PROCESS.)

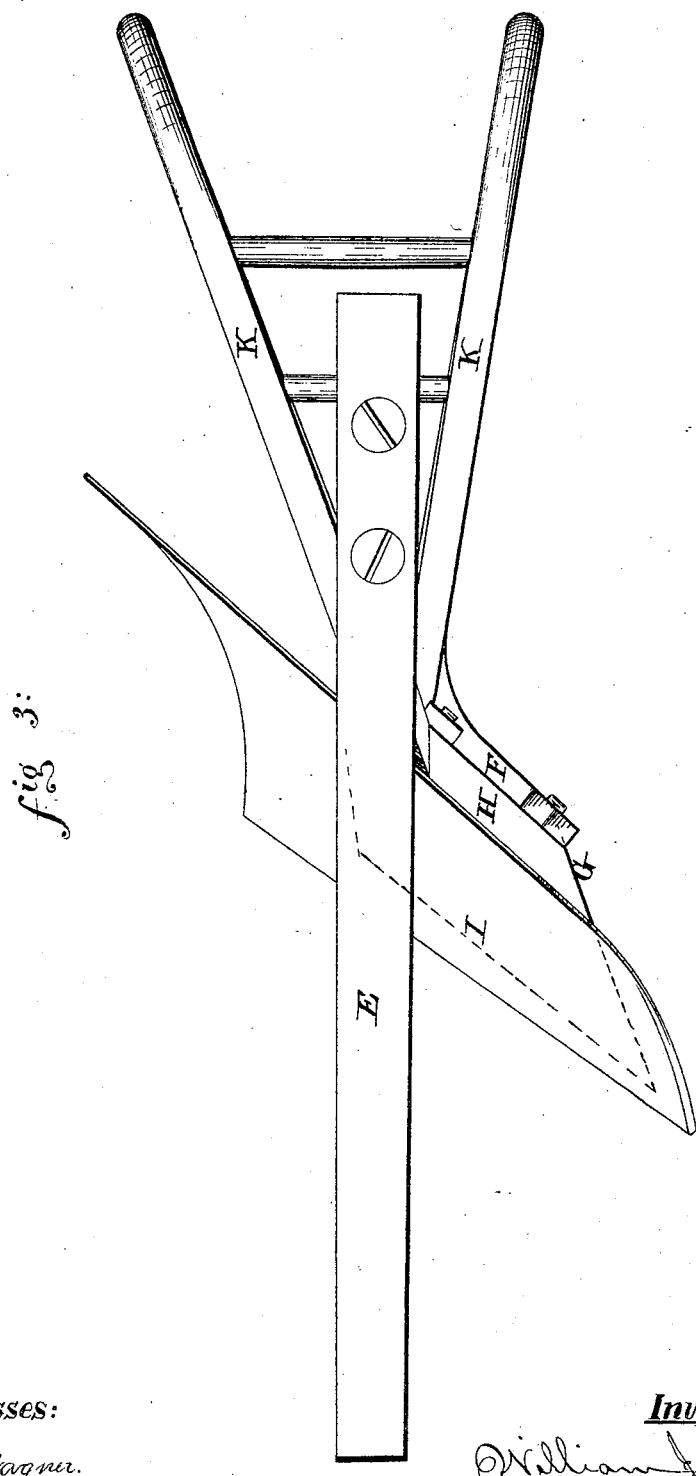

UNITED STATES PATENT OFFICE.

WILLIAM JARRELL, OF HUMBOLDT, TENNESSEE.

IMPROVEMENT IN COTTON-SCRAPERS.

Specification forming part of Letters Patent No. 141,355, dated July 29, 1873; application filed June 14, 1873.

*To all whom it may concern:*

Figure 1:
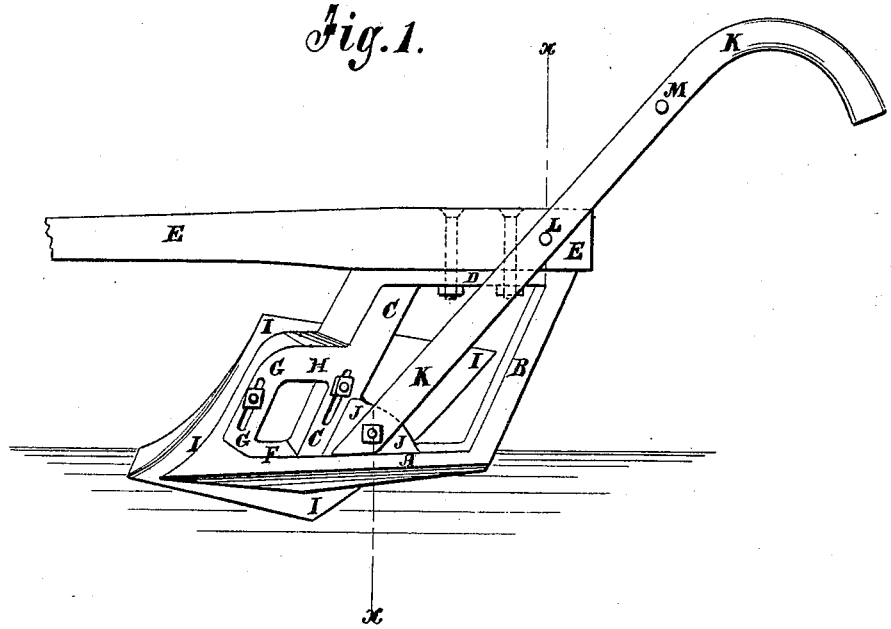
Figure 2:
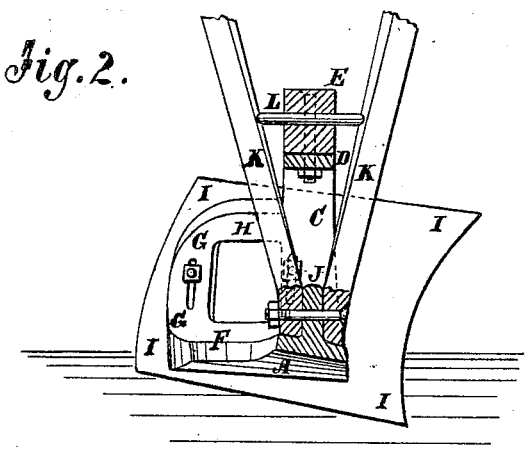

Be it known that I, WILLIAM JARRELL, of Humboldt, in the county of Gibson and State of Tennessee, have invented a new and useful Improvement in Cotton-Scraper, of which the following is a specification:

Figure 1 is a side view of my improved cotton-scraper. Fig. 2 is a detail section of the same taken through the line x x, Fig. 1. Fig. 3 represents a top view of the scraper, showing more clearly the leftwise toe-piece or share-support and the balanced draft-line.

Similar letters of reference indicate corresponding parts.

In cotton-scrapers the share works upon a ridge, the left-hand or advancing corner being nearest the plants and merely skims the ground, while the right-hand corner digs into the soil about two inches. In such scrapers it is of the highest importance to prevent side draft. To this end my invention consists in providing the front standard and foot-bar for the share with a toe-piece extending obliquely forward and leftwise from said foot-bar, and connecting said toe-piece with the upper part of the front standard, by means of an angle arm or brace, which, with the front standard and foot-bar, forms the seat for the share entirely upon the left side of the line of draft, and thus leaves a free and unobstructed space on the left side in the rear of the share, so that it is impossible for any point of the foot-bar to rub the plants, or run into the row, or crowd the soil upon the tender plants. By this arrangement, also, the line of draft is brought very near the right or outer corner of the share, causing the scraper to run straight and steady, easily managed and controlled. This left-hand oblique lateral extension of the front standard and foot constitutes the feature of my invention, and the advantages resulting therefrom are of practical and useful importance in the cultivation of cotton. The obliquely-extending frontward and leftward toe-piece and angle arm or brace is shown in the drawings to be all on the left side of the line of draft, and of a vertical line through the beam.

A is the bar or foot, with the rear end of which is connected the lower end of the rear standard B, and with its forward end is connected the lower end of the forward standard C. The standards B C incline to the rearward, and their upper ends are connected by a bar, D, to which the plow-beam E is securely bolted. The share seat or support consists of a single casting, having a foot, A, a front and rear standard, C B, and a toe-piece or seat, F G H, extending from the front standard and the foot A, all to the left side of said foot, so as to bring the line of draft near the right corner of the share. Upon the forward side of the parts C F G H is formed the seat for the scraper-plate I, which is secured in place by bolts, which pass through holes in the plate I, and through short vertical slots in the forward standard C, and in the arm G, to enable the scraper I to be moved down as its lower edge wears away. Upon the upper side of the bar or foot A, between the standards B C, is formed a lug or flange, J, to the opposite sides of which are bolted the lower ends of the handles K, which are supported by a round, L, passing through the rear end of the beam E, and are held in the proper relative position by a round, M, passing through their upper parts. This arrangement of the handles gives a great advantage of leverage for guiding the scraper.

With this construction, when the scraper is at work, the left-hand part of its edge skims along the surface of the ground, while the lower part of said edge enters the ground more deeply, thus giving the proper inclination to the ridge. The parts A B C D F G H J are designed to be cast in one piece.

It will be observed that with my improvement the weight of the casting is thrown upon the left-hand side of the beam, and the center of resistance is brought directly beneath the beam and within the line of draft, causing the scraper to run steady, enabling it to be readily guided and controlled, and preventing any side draft.

Having thus described my invention, I claim as new and desire to secure by Letters Patent—

The obliquely-extending frontward and leftward toe-piece F G H of the standard C, in combination with the scraper I and beam E, all constructed and arranged as shown and described.

WILLIAM JARRELL.

Witnesses:
  Jo. W. LANNOM,
  J. E. D. SCOTT.